United States Patent
Scheideler et al.

(10) Patent No.: US 6,649,201 B2
(45) Date of Patent: Nov. 18, 2003

(54) EGGSHELL DERIVED MONOCALCIUM AND DICALCIUM PHOSPHATE

(75) Inventors: Sheila E. Scheideler, Lincoln, NE (US); Jodi A. Ash, Cleveland, GA (US)

(73) Assignee: Board of Regents of University of Nebraska, Lincoln, NE (US)

( * ) Notice: Subject to any disclaimer, the term of this patent is extended or adjusted under 35 U.S.C. 154(b) by 0 days.

(21) Appl. No.: 10/050,746

(22) Filed: Jan. 16, 2002

(65) Prior Publication Data

US 2002/0150651 A1 Oct. 17, 2002

Related U.S. Application Data

(60) Provisional application No. 60/261,918, filed on Jan. 16, 2001.

(51) Int. Cl.[7] ............................................... A23K 1/175
(52) U.S. Cl. ........................ 426/74; 426/805; 426/807
(58) Field of Search ........................... 426/74, 805, 807

(56) References Cited

FOREIGN PATENT DOCUMENTS

| DE | 19800149 | * | 7/1999 |
|---|---|---|---|
| GB | 1509680 | * | 5/1978 |
| GB | 2332426 | * | 6/1999 |
| JP | 2000007459 | * | 1/2000 |
| WO | 91/03167 | * | 3/1991 |

OTHER PUBLICATIONS

Guinotte et al., World Poultry, vol. 10(6), p. 43, 1994.*

* cited by examiner

Primary Examiner—Chhaya Sayala
(74) Attorney, Agent, or Firm—Shook, Hardy & Bacon LLP

(57) ABSTRACT

An eggshell-derived product is utilized as an alternative feed grade calcium and phosphorous source for potential use for all species of livestock. The product is environmentally advantageous and biologically equivalent or superior to currently available commercial products such as feed grade dicalcium phosphate. A method of producing the product elicits monocalcium phosphate and/or dicalcium phosphate from a combination of dried eggshell waste and phosphoric acid, using water as a catalyst.

14 Claims, No Drawings

EGGSHELL DERIVED MONOCALCIUM AND DICALCIUM PHOSPHATE

CROSS-REFERENCE TO RELATED APPLICATIONS

This application claims the benefit of Provisional Application No. 60/261,918, filed Jan. 16, 2001.

STATEMENT REGARDING FEDERALLY SPONSORED RESEARCH OR DEVELOPMENT

Not Applicable.

BACKGROUND OF THE INVENTION

The present invention relates to nutritional supplementation of feedstuffs. More specifically, eggshell waste is utilized in producing feed grade monocalcium phosphate and dicalcium phosphate.

Nutritional demands for calcium and phosphorus in livestock diets are often not met without nutritional supplements. Supplementation is generally necessary, as traditional feedstuffs do not contain an adequate amount of these micronutrients. This nutritional deficit must be addressed, as calcium and phosphorus are critical for the maintenance, growth, and production of livestock. While calcium sources are typically well utilized, phosphorus sources significantly differ in bioavailability. Although the product of the present invention provides both calcium and phosphorus, its commercial value is primarily as a phosphorus source. Effective calcium sources are inexpensive and readily available. Phosphorus sources, in contrast, are typically neither inexpensive nor readily available. In fact, regardless of species, providing effective amounts of phosphorus constitutes the majority of production costs in terms of micronutrient supplementation.

Commercial feed grade phosphates are typically manufactured from limestone and other inorganic cation sources in combination with phosphate sources such as phosphoric acid. Bone, bone derivatives, rock phosphates, salts, and acids are also components of phosphate supplements. Limestone is the calcium carbonate source typically used for conventional products, and the costs associated with mining, processing, transporting, and purifying the limestone are substantial.

The present invention provides an environmentally beneficial and cost-effective method of producing feed grade monocalcium phosphate and dicalcium phosphate utilizing an organic byproduct, eggshell waste.

SUMMARY OF THE INVENTION

It is an object of the present invention to provide an eggshell derived product which can be utilized as a feed grade calcium and phosphorus source for potential use for all species of livestock.

It is a further object of the present invention to provide a method to produce an eggshell derived product which can be utilized as a feed grade calcium and phosphorus source for potential use for all species of livestock.

It is yet another object of the present invention to provide an eggshell derived product, and a method of producing the same, which is biologically equivalent or superior to feed grade dicalcium phosphate, a currently available commercial product.

According to the present invention, the foregoing and other objects are achieved by a method for producing an eggshell-derived product which can be utilized as a feed grade calcium and phosphorous source for livestock, comprising combining eggshell waste and phosphoric acid, using water as a catalyst, to elicit monocalcium phosphate and dicalcium phosphate.

DETAILED DESCRIPTION OF THE PREFERRED EMBODIMENTS

In the present invention, eggshell waste, a byproduct of the egg breaking industry, and phosphoric acid are utilized to produce a novel monocalcium phosphate and/or dicalcium phosphate source. The basic production method elicits monocalcium phosphate and/or dicalcium phosphate from a combination of dried eggshell waste and phosphoric acid. This is accomplished by adding phosphoric acid to the eggshell waste, using water as a catalyst. It will be understood by one skilled in the art that his basic approach can be used to generate other chemical combinations of calcium and phosphorus by adjusting the quantity of the components.

The composition of the eggshells, by weight, is generally approximately 37–38% calcium (as calcium carbonate), 0.10–0.15% phosphorous, and 4.5–9.5% protein, at about 98.5% dry matter content. The phosphoric acid is generally approximately 85% concentrate by molecular weight.

The general equations relating to the primary products and methods of the present invention are as follows:

Monocalcium phosphate:

$$CaCO_3 + H_3PO_4 + H_2O \ggg CaH_3PO_4 + H_2O + CO_2$$

and

Dicalcium phospate:

$$CaCO_3 + 2H_3PO_4 + H_2O \ggg Ca(H_2PO_4)_2 + H_2O + CO_2$$

The $CaCO_3$ source is eggshell for either of the aforementioned products.

As an example, the proportions of additives combined for reaction to proceed is: 510 g eggshells+543 ml 85% $H_3PO_4$+1086 ml deionized water>>>>approx. 1000 g product The eggshell derived monocalcium phosphate (EDMCP) product is generally comprised, by weight, of approximately 19% calcium and approximately 21.5% phosphorus, with a dry matter content of about 94%. It will be understood by one skilled in the art that the product may comprise monocalcium phosphate, dicalcium phosphate, or both monocalcium phosphate and dicalcium phosphate.

To produce the product of the present invention, a uniform mixture is made comprising about one (1) part phosphoric acid diluted with about two (2) parts water. As a result of this process, some heat is generated.

The diluted acid is next slowly added to the eggshells, while stirring. The rate of addition should be slowly decreased. It is necessary to maintain a proper surface-to-air ratio during the mixing process to ensure adequate $CO_2$ dissipation. Considerable amounts of foaming will occur. This foam, the basis of the final product, is reduced by stirring until the foam is dense and stable. This reaction neither requires nor generates heat and is complete within minutes of the addition of the reactants.

To process the foam into a useable form, the foam is spread over a substantially flat surface. The surface is to be of a sufficiently large area to enable the foam to be spread at a thickness of not more than about ¾ inch. The product then dries. Adequate ventilation and air flow is necessary, and low humidity will facilitate drying. Occasional stirring during the drying process will allow for accelerated water evaporation. The application of low heat at approximately 100° F. or greater to the air-dried product will further reduce moisture content and promote flowability. The application of excess heat (generally about 300° F. or greater) early in the drying process is generally destructive. Once the product is thoroughly dried, further processing is necessary. Specifically, the product is ground into a fine powder.

A study was conducted to evaluate the relative bioavailability of eggshell derived monocalcium phosphate (EDMCP) in comparison to a commercial dicalcium phosphate (CDP) source in starter chick diets. Nine hundred and twenty-four (924) two-day-old male Cornish Rock broilers were fed the two phosphate sources in a 2×7 factorial design experiment. EDMCP was compared to CDP at seven levels of inclusion for available phosphorus (AP) ranging from 0.1% to 0.45% AP. Each dietary treatment was replicated six times with eleven chicks per pen during a 21-day experimental period. Analysis showed body weight (BW) at three weeks as affected by AP levels to be highly significant ($P<0.0001$) as expected. No significant difference was found, however, between AP sources for BW at three weeks. At day 21, the chicks fed 0.45% AP levels weighed, on average, 861.6 grams for the EDMCP group and 853.6 grams for the CDP group. A slope ratio assay using linear regression analysis was used to determine relative bioavailabilities. Regression of AP levels on P source for week 3 BW resulted in a relative bioavailability of 102.1% for EDMCP in comparison to the CDP. No significant difference ($P<0.8$) was found for feed conversion with regard to the source and, again, feed conversion was highly significant in relation to level of P feed ($P<0.0009$). For the 21-day experimental period, chicks fed EDMCP at the 0.45% AP level converted at 1.51, whereas chicks fed CDP converted at 1.53. There was no statistical significance in death loss with relation to the source of P. In conclusion, these investigations showed that the EDMCP was biologically equivalent to the commercial standard of phosphorus for supplemental phosphorus in broiler chick diets.

In addition to the nutritive value as a phosphorus and calcium source, eggshell derived monocalcium phosphate and dicalcium phosphate sources also maintain physical characteristics that are conducive to diet integration. In final form, this product is of a light, powdery consistency that should facilitate flowability. The dry matter content, although analyzed at 94%, can be altered to attain a dryer end product depending on preference. This product is also water soluble which not only aids the digestibility of the product, but also allows for integration into liquid supplementation.

To date, eggshells have not been utilized in the production of feed grade calcium phosphate. This invention is unique in that it utilizes an organic byproduct, specifically eggshells, to produce an integral feed ingredient for animal consumption and production. The costs of raw ingredients for producing the product of the present invention will be considerably less than ingredients for conventional phosphate sources. Since eggshell waste is a byproduct of the egg breaking industry, there is currently a cost associated with eggshell disposal. Currently, processed eggshell "waste" is sometimes sold, but the monies realized from the sale of the "waste" do not offset the cost of processing.

In addition to the cost of disposal, there are also environmental benefits associated with the use of eggshell derived monocalcium phosphate and dicalcium phosphate. The phosphate faction of the product has been shown to be more available to the animal than currently available commercial products, which will help reduce phosphorous loading in the soil from animal production systems. In addition, it will reduce the accumulation of eggshell waste in dumps and on farmlands surrounding egg breaking facilities. As a result, hydrogen sulfide odor problems associated with the stockpiling of eggshell waste will also be reduced or eliminated.

It will be seen from the foregoing that this invention is one well adapted to attain the ends and objects set forth above, and to attain other advantages which are obvious and inherent in the product and method. It will be understood that certain features and subcombinations are of utility and may be employed without reference to other features and subcombinations. This is contemplated by and within the scope of the invention. It will be appreciated by persons skilled in the art that the product and method of the present invention are not limited to what has been particularly shown and described hereinabove. Rather, all matter herein set forth is to be interpreted as illustrative and not limiting.

We claim:

1. A feed source for livestock, comprising the mixture of:

phosphoric acid;

water; and eggshell, wherein said phosphoric acid, said water, and said eggshell react to form a product, said product dried to form said feed source, said feed source comprising monocalcium phosphate and dicalcium phosphate.

2. The feed source of claim 1, wherein said phosphoric acid has a concentration of about 85% by molecular weight.

3. The feed source of claim 1, wherein said water is deionized.

4. The feed source of claim 1, wherein said eggshell is comprised of about 37–38% by weight calcium, about 0.10–0.15% by weight phosphorus, and about 4.5–9.5% by weight protein.

5. The feed source of claim 4, wherein said eggshell is about 98.5% by weight dry matter.

6. The feed source of claim 1, wherein said feed source comprises monocalcium phosphate having about 19% by weight calcium and about 21.5% by weight phosphorous.

7. The feed source of claim 6, wherein said monocalcium phosphate is about 94% by weight dry matter.

8. A method for producing a feed source for livestock using phosphoric acid, water, and eggshell, said method comprising:

crushing said eggshell;

mixing said phosphoric acid with said water to form a mixture, wherein said mixture is about 1 part phosphoric acid and about 2 parts water;

adding said mixture to said crushed eggshell to form a foam;

drying said foam; and grinding said foam into a powder, said powder comprising monocalcium phosphate and dicalcium phosphate.

9. The method of claim 8, wherein said drying step comprises heating said foam to a temperature approximately in the range of 100° F. to 300° F.

10. The method of claim 8, further comprising:

spreading said foam over a surface before drying said foam.

11. The method of claim 10, wherein said foam is spread over said surface to a thickness of no more than about ¾ inch.

12. The method of claim 8, further comprising:

stirring said foam during said drying step.

13. The product of the process of claim 8.

14. The product of the process of claim 9.

* * * * *